May 7, 1929.　　　C. J. BEAVER　　　1,711,555
MANUFACTURE OF MULTICORE ELECTRIC CABLES
Filed March 2, 1927　　　4 Sheets-Sheet 1

Inventor
Charles James Beaver
By Mason Fenwick & Lawrence,
Attorneys

May 7, 1929.   C. J. BEAVER   1,711,555
MANUFACTURE OF MULTICORE ELECTRIC CABLES
Filed March 2, 1927   4 Sheets-Sheet 2
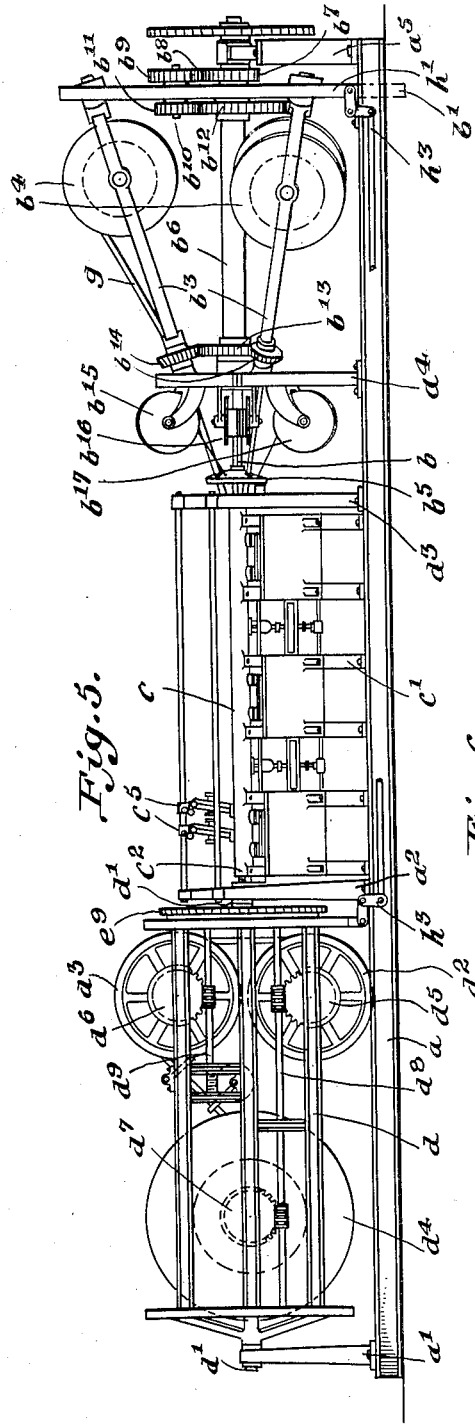
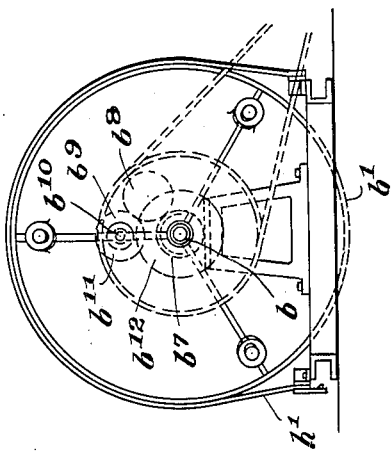
Inventor
Charles James Beaver
By Maern Fenwick&Lawrence
Attorneys May 7, 1929.  C. J. BEAVER  1,711,555
MANUFACTURE OF MULTICORE ELECTRIC CABLES
Filed March 2, 1927  4 Sheets-Sheet 4
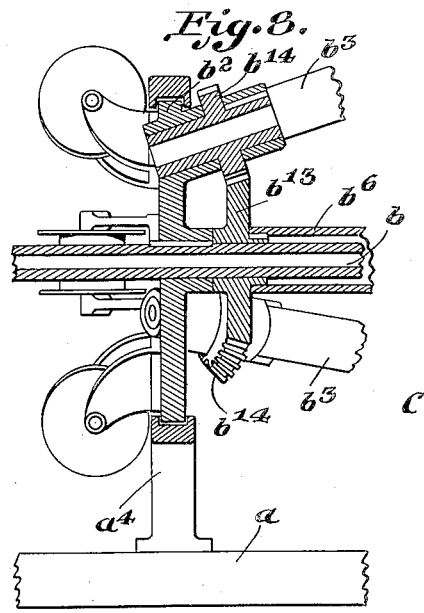
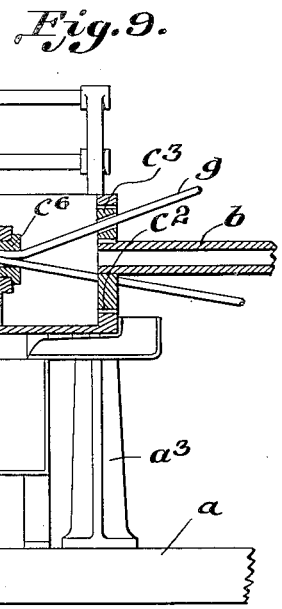
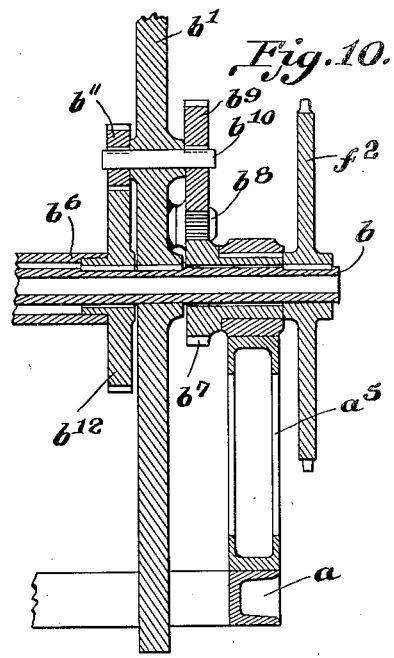
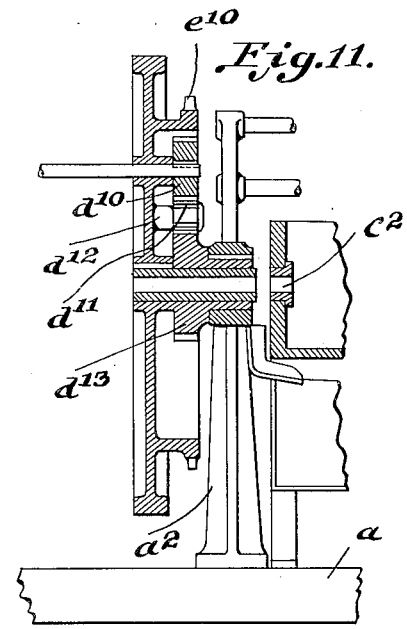
Inventor
Charles James Beaver
By Baron Fenwick Lawrence
Attorneys Patented May 7, 1929.

1,711,555

UNITED STATES PATENT OFFICE.

CHARLES JAMES BEAVER, OF BOWDEN, ENGLAND, ASSIGNOR TO W. T. GLOVER & COMPANY LIMITED, OF MANCHESTER, ENGLAND.

MANUFACTURE OF MULTICORE ELECTRIC CABLES.

Application filed March 2, 1927, Serial No. 172,181, and in Great Britain March 13, 1926.

This invention has reference to the insulation of electric multi-core cables where the longitudinal interstices between insulated conductors are filled with strips of material of suitable cross section shape and there is an over-all lapping of strips of suitable material.

The object of the invention is to fill up the said interstices and all crevices between the insulated conductors, fillings, and lappings with insulating compound in a manner more efficient than is done by any methods heretofore in use, and a further object is to effect an economy in manufacture.

I construct a machine or combination of machines comprising a laying-up machine, an elongated trough with an orifice at each end, and a carriage carrying a haul-off wheel and receiving drums, combined and arranged to enable the twisted conductors emanating from the laying-up machine to pass through the trough via the said orifices, and to the haul-off wheel and receiving drum in a continuous operation. Means are provided for rotating the carriage carrying the haul-off wheel and receiving drums and the laying-up machine, on an axis in line with the orifices of the trough at relative speeds, that of the laying-up machine being faster or slower than that of the carriage to the degree necessary to secure the required pitch of the lay of the insulated conductors, and for positively driving the haul-off wheel and if desired pay-out drums, and providing for the required variation of speed thereof.

In carrying my invention into effect, a special arrangement of gears are provided to control drums carrying circular insulated conductors, and which are prevented from rotating relative to the haul-off wheel and receiving drum.

In the accompanying drawings an example of machinery for giving effect to, and constituting, my invention is illustrated, the machine being arraged to lay up three circular insulated conductors.

Figures 1, 2, 3 and 4 are four diagrammatic drawings to illustrate respectively the position and movements of drums in the laying-up machine relatively to the haul-off wheel.

Figure 1:
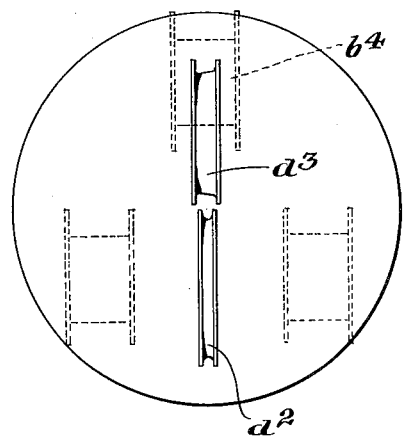
Figure 2:
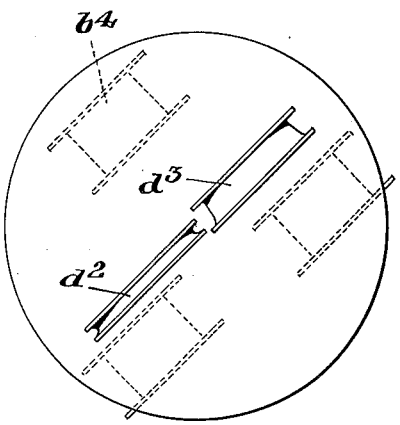
Figure 3:
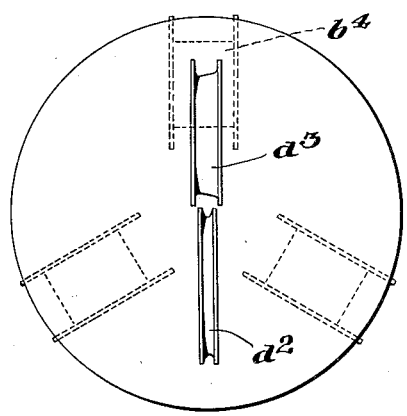
Figure 4:
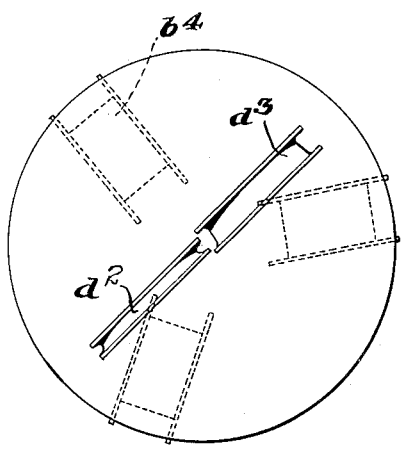

Figures 1 and 2 show the relative positions of the haul-off wheel and of the drums in the laying-up machine in two relative positions of the carriages of such wheel and drums when the machine is arranged to lay-up circular conductors. It will be seen that the planes of the haul-off wheel and the drums remain parallel. Figures 3 and 4 show the relative positions of the same wheel and drums in like positions of the carriages when the machine is arranged to lay-up conductors of other cross section shape. It will be seen that the planes through the centre of the drums are radial in relation to the axis of rotation of the carriage.

Figure 7:
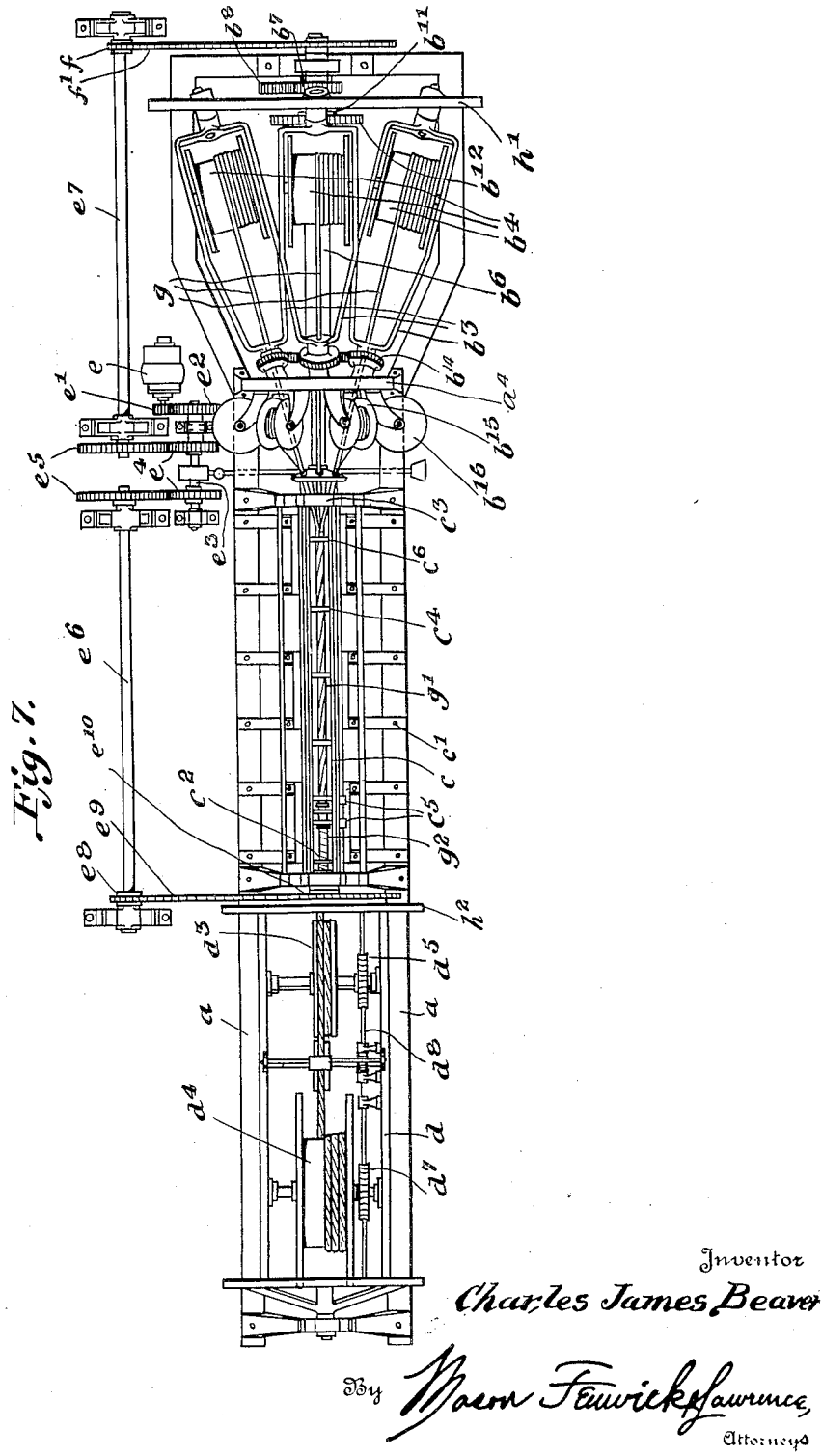

Figure 5 is a side elevation, Figure 6 an end view and Fig. 7 a plan view of the combination. Figure 8 is a vertical section (on an enlarged scale) through the revolving plate hereinafter referred to. Figure 9 is a section through the revolving end of the trough. Figure 10 is a vertical section of the rear end of the carriage of the laying-up machine. Figure 11 is a vertical section through the end of the haul-off carriage adjacent to the trough.

$a$ $a$ are two girders running the whole length of and supporting the machine, $a^1$, $a^2$, $a^3$, $a^4$ and $a^5$ are vertical frames bolted to the girders $a$ $a$ supporting the apparatus.

I will describe the three parts of the combination, the laying-up machine, the trough, and the receiving apparatus seriatim, and firstly the laying-up machine.

$b$ is a hollow shaft rotating in bearings supported by the vertical frames $a^4$ and $a^5$; $b^1$ is a wheel rigidly mounted on the shaft $b$; $b^2$ is a circular member also rigidly mounted on the shaft $b$; and $b^3$ are three rotatable frames journalled in perforated bosses formed on the wheel $b^1$ and circular member $b^2$; $b^4$ are three drums carried on spindles rotating in bearings carried by the frames $b^3$; $b^5$ is a circular member rigidly fixed to the shaft $b$ with suitably disposed holes therethrough to act as a preliminary guide leading the insulated conductors together with the fillings to the point of convergence; $b^6$ is a tubular shaft mounted loosely on the said shaft $b$; $b^7$ is a pinion rigidly secured to the frame $a^5$ engaging a pinion $b^8$ freely mounted on a shaft carried by the wheel $b^1$ which in turn engages a pinion $b^9$ rigidly mounted on a shaft $b^{10}$ rotating in bearings carried by the wheel $b^1$; $b^{11}$ is another pinion rigidly mounted on the last mentioned shaft and which engages a pinion $b^{12}$ secured for rotation to the hollow shaft $b^6$; and $b^{13}$ is a bevel pinion secured for rotation to the shaft $b^6$ which engages bevel pinions $b^{14}$ respectively rigidly mounted on the axles of the frames $b^3$.

The number of teeth on the respective pinions is such that, (notwithstanding the rotating of the shaft $b$ and the members rigidly secured thereto, is at a speed varying from that of the carriage of the haul-off wheel and receiving drum), the frames $b^3$ and the drums $b^4$ always remain in planes having the same relationship to the plane of the haul-off wheel.

There are six spools fixed to the circular member $b^2$ carrying strips of filling material, (two for each outer space between the insulated conductors) of which five $b^{15}$, $b^{16}$, $b^{17}$ and two others are shown in the illustrations. The filling for the centre space is fed through the centre of hollow shaft $b$. $c$ is an elongated trough supported on feet $c^1$ having a central hole in the end $c^2$ (see Figure 9). $c^3$ is a circular member fitting the hole in the end $c^2$ and arranged to rotate, and is fixed for rotation to the shaft $b$. Through this circular end are suitably disposed holes for the insulated conductors and strips of filling to pass to their converging point at the laying-up die. $c^4$ are guides with suitably shaped holes to guide the conductors through the trough, $c^5$ are lapping heads from which strips of insulation material are being unwound and lapped on the conductors and fillings, and $c^6$ is a bell-mouthed laying up die (see Figure 9).

$d$ is a rotatable carriage with journals $d^1$ rotating in bearings supported by the vertical frames $a^1$ and $a^2$, $d^2$ is the haul-off wheel, $d^3$ a secondary haul-off or fleeting wheel and $d^4$ the receiving drum. The wheels $d^2$ and $d^3$ are mounted rigidly and the drum $d^4$ through a friction device on spindles rotating in bearings supported by the frame.

The spindles carrying the drums $d^2$, $d^3$ and $d^4$ are respectively driven by pinions $d^5$, $d^6$ and $d^7$ rigidly mounted thereon and having skew teeth, the shafts $d^8$ and $d^9$ provided with worms respectively engaging the skew teeth, pinions $d^{10}$ (one only shown) rigidly mounted on shafts $d^8$ and $d^9$, pinions $d^{11}$ (one shown) freely mounted on trunnions $d^{12}$ (one shown) projected from wheel $e^{10}$ hereinafter referred to, and engaging the pinion $d^{13}$ rigidly secured to the frame $a^2$.

The mounting of the drum $d^4$ through a friction device is so as to allow the required amount of slip to accommodate to the ever enlarging diameter of the winding surface as the drum gathers up the cable.

The combination is driven by the motor $e$ through the pinions $e^1$, $e^2$, shaft $e^3$, pinions $e^4$ and $e^5$ and shafts $e^6$ and $e^7$. The carriage of the haul-off wheel and receiving drums is driven from the shaft $e^6$ through sprocket wheel $e^8$, chain $e^9$, and sprocket wheel $e^{10}$ which is rigidly mounted on a hollow trunnion or journal projected from the carriage $d$. The laying-up machine is driven from the shaft $e^7$ through sprocket wheel $f$, chain $f^1$, and sprocket wheel $f^2$ which is rigidly mounted on shaft $b$. The shaft $b$ and parts fixed thereto and the carriage $d$ are made to rotate at the required different speeds by varying the sizes of the pinions $e^4$ and $e^5$. $g$ are three insulated conductors unwinding from drums $b^4$, $g^1$ is the cable comprising the laid-up conductors and fillings and $g^2$ is the cable with the outside lapping thereon. $h^1$ and $h^2$ are band brakes operated by levers $h^3$.

By means of the apparatus described the insulated conductors can be laid up with strips of absorbent material, filling up the interstices between the conductors, and can be passed into a trough of molten insulating material, and while immersed the over-all layer of insulation can be laid on, and that all in one operation, and in a continuous operation for the full length of the cable; further air and gases are excluded from the interstices, fillings, and over-all insulation more effectively than by any method heretofore in use, and much economy in working is effected.

The invention is equally applicable for cables whether the spaces between the conductors, and between the conductors and outside lapping, are filled with fibrous material such as paper saturated with insulation compound, or non-fibrous material such as bitumen.

What I claim is:—

1. Apparatus for the purpose of manufacturing multi-core electric cables, comprising in combination, an elongated trough adapted to contain liquid electric insulating material and having aligned holes through opposite ends, a laying-up machine located at one end of the trough, and a haul-off and receiving machine, located at the other end thereof, said laying-up machine being provided with means for concurrently paying out and feeding to said trough, insulated conductors and strips of filling material, and said haul-off and receiving machines being each mounted on a rotating carriage, said carriages having their axes in alignment with the holes in the ends of the trough and means whereby the carriages are rotated at different speeds.

2. An apparatus according to claim 1, in which the driving mechanism for the laying-up and hauling-off machines comprise two rotatable shafts, respectively parallel to the axis of said machines, a third rotatable shaft parallel to the said two shafts and overlapping each of them, operatively connected to a source of power, pinions mounted on said third shaft, engaging with pinions on the said two shafts and the laying-up and hauling-off carriages, all the elements being so constructed and disposed that the carriages may be rotated at different pre-determined speeds.

3. An apparatus according to claim 1, and comprising a trough having a rotatable end adjacent the laying-up carriage, with holes through said end for the passage therethrough of insulated conductors and strips, to a point of convergence within said trough, said rotatable end being attached to and rotating with the carriage of the laying up machine.

4. An apparatus according to claim 1, and with means for maintaining the said drums of the laying up machine in parallel relationship with that of the haul-off wheel.

5. Apparatus for the purpose of manufacturing multi-core electric cables, comprising, in combination, an elongated trough adapted to contain liquid electric insulating material and having aligned holes through opposite ends, a laying up machine located at one end of the trough, and a haul-off and receiving machine, located at the other end thereof, said lay-up machine being provided with means for concurrently paying out and feeding to said trough, insulated conductors and strips of insulating filling material, and said haul-off and receiving machines being each mounted on a rotating carriage, said carriages having their axes in alignment with the holes in the ends of the trough, means whereby the carriages are rotated at different speeds and means for regulating the relative speed of the carriages.

In witness whereof I have signed this specification.

CHARLES JAMES BEAVER.